(12) United States Patent
Chang et al.

(10) Patent No.: US 11,960,138 B2
(45) Date of Patent: Apr. 16, 2024

(54) ACTIVE ALIGNMENT MACHINE

(71) Applicant: PRIMAX ELECTRONICS LTD., Taipei (TW)

(72) Inventors: Ching-Hui Chang, Taipei (TW); Yi-Hou Chen, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 469 days.

(21) Appl. No.: 17/482,484

(22) Filed: Sep. 23, 2021

(65) Prior Publication Data
US 2023/0050012 A1    Feb. 16, 2023

(30) Foreign Application Priority Data
Aug. 12, 2021  (TW) ................. 110129831

(51) Int. Cl.
G02B 7/00       (2021.01)
G02B 7/182      (2021.01)

(52) U.S. Cl.
CPC .......... G02B 7/005 (2013.01); G02B 7/1827 (2013.01)

(58) Field of Classification Search
CPC .............................. G02B 7/005; G02B 7/1827
USPC ......................................................... 359/754
See application file for complete search history.

(56) References Cited

U.S. PATENT DOCUMENTS

2007/0159532 A1*  7/2007  Kiyokawa ............ H04N 17/002
                                                      348/187

* cited by examiner

*Primary Examiner* — Wyatt A Stoffa
*Assistant Examiner* — Mitchell T Oestreich
(74) *Attorney, Agent, or Firm* — WPAT, P.C

(57) ABSTRACT

An active alignment machine includes a base, a first pillar, a second pillar, a distribution module, a first alignment module, a second alignment module and a third alignment module. The first pillar has a first pillar top surface. The second pillar has a second pillar top surface. The first pillar top surface and the second pillar top surface cooperatively support plural assembling specifications. The distribution module is installed on the base and arranged between the first pillar and the second pillar. The first alignment module, the second alignment module and third alignment module are replaceable to be assembled with or dissembled from the first pillar top surface and the second pillar top surface. The first alignment module, the second alignment module and third alignment module work with the distribution module to perform the active alignment on a first-type product, a second-type product and a third-type product, respectively.

17 Claims, 12 Drawing Sheets

ACTIVE ALIGNMENT MACHINE

FIELD OF THE INVENTION

The present invention relates to an active alignment machine, and more particularly to an active alignment machine for performing an active alignment process on plural different types of image pickup devices or products in a modularized manner.

BACKGROUND OF THE INVENTION

With the gradual development of image sensing technologies, modern people have become accustomed to using related digital electronic products for taking photographs or taking pictures. In addition, complementary metal oxide semiconductor (CMOS) or charge-coupled device (CCD) image sensing technologies are used to design the image sensors in these products such as digital cameras, smart phones or driving recorders. Moreover, the image sensor and one or more lens elements are combined as an image pickup device of the product.

Since the image sensing technology is an extremely sophisticated optoelectronic technology, the image sensor and the corresponding lens element during the cooperative installation have to be adjusted through the rigorous focusing adjustment, the optical center alignment and associated adjustment on the production line. After the adjustment, the components are not suffered from the tilting situation or misalignment. Consequently, the image sensing quality is not adversely affected. The adjustment is referred as an active alignment (AA) process. The active alignment process can be performed by using related alignment machines or alignment modules. After the active alignment process is completed, a procedure of fixing the image sensor and the lens element is performed. For example, a glue bonding procedure and a UV curing procedure are performed on a circuit board in order to fix the image sensor and the lens element on the circuit board.

Moreover, in case that the image pickup devices or products to be manufactured are different, the alignment machines or alignment modules to be used are different. For example, these products are classified into many types, including a compact camera module (CCM) with a view angle smaller than 80 degrees, a vehicle wide-angle module with a view angle larger than 80 degrees, a folded camera module, and the like. These products undergo the alignment processes by using the exclusive alignment machines or alignment modules and using the exclusive alignment technologies. That is, if the exclusive alignment machines or alignment modules are not used, different types of image pickup devices or products cannot undergo the active alignment processes.

Generally, the manufacturer usually manufactures and produces more than one type of image pickup device or product. In other words, when the active alignment (AA) process is performed on the production line, more than one alignment machine or alignment module needs to be prepared. Consequently, the production cost and the development cost of the manufacturer increase. In addition, the number of machines to be maintained increases, and more installation space of the production line is occupied.

On the other hand, it is currently possible to customize the alignment machine for allowing the same machine to perform the active alignment process on two types of the above image pickup devices or products. However, the customized alignment machine is only able to perform the active alignment process on the two customized types of image pickup devices or products. That is, the customized alignment machine is unable to perform the active alignment process on three types or more than three types of image pickup devices or products.

Therefore, it is important to provide an alignment machine or alignment module that can be flexibly used to support the active alignment process for various types of image pickup devices or products.

SUMMARY OF THE INVENTION

The present invention provides an active alignment machine. The active alignment machine includes plural alignment modules. The alignment modules are replaceable to be assembled with or disassembled from the corresponding groups of pillars in a modularized manner. Consequently, the active alignment process can be performed on plural different types of image pickup devices or products.

In accordance with an aspect of the present invention, an active alignment machine is provided. The active alignment machine includes a base, a first pillar, a second pillar, a distribution module, a first alignment module, a second alignment module and a third alignment module. The first pillar is installed on the base. The first pillar has a first pillar top surface. The second pillar is installed on the base. The second pillar has a second pillar top surface. The first pillar top surface and the second pillar top surface cooperatively support plural assembling specifications. The distribution module is installed on the base and arranged between the first pillar and the second pillar. The first alignment module performs an active alignment after being assembled. The second alignment module performs the active alignment after being assembled. The third alignment module performs the active alignment after being assembled. The first alignment module, the second alignment module and third alignment module are replaceable to be assembled with or dissembled from the first pillar top surface and the second pillar top surface. The first alignment module, the second alignment module and third alignment module work with the distribution module to perform the active alignment on a first-type product, a second-type product and a third-type product, respectively.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
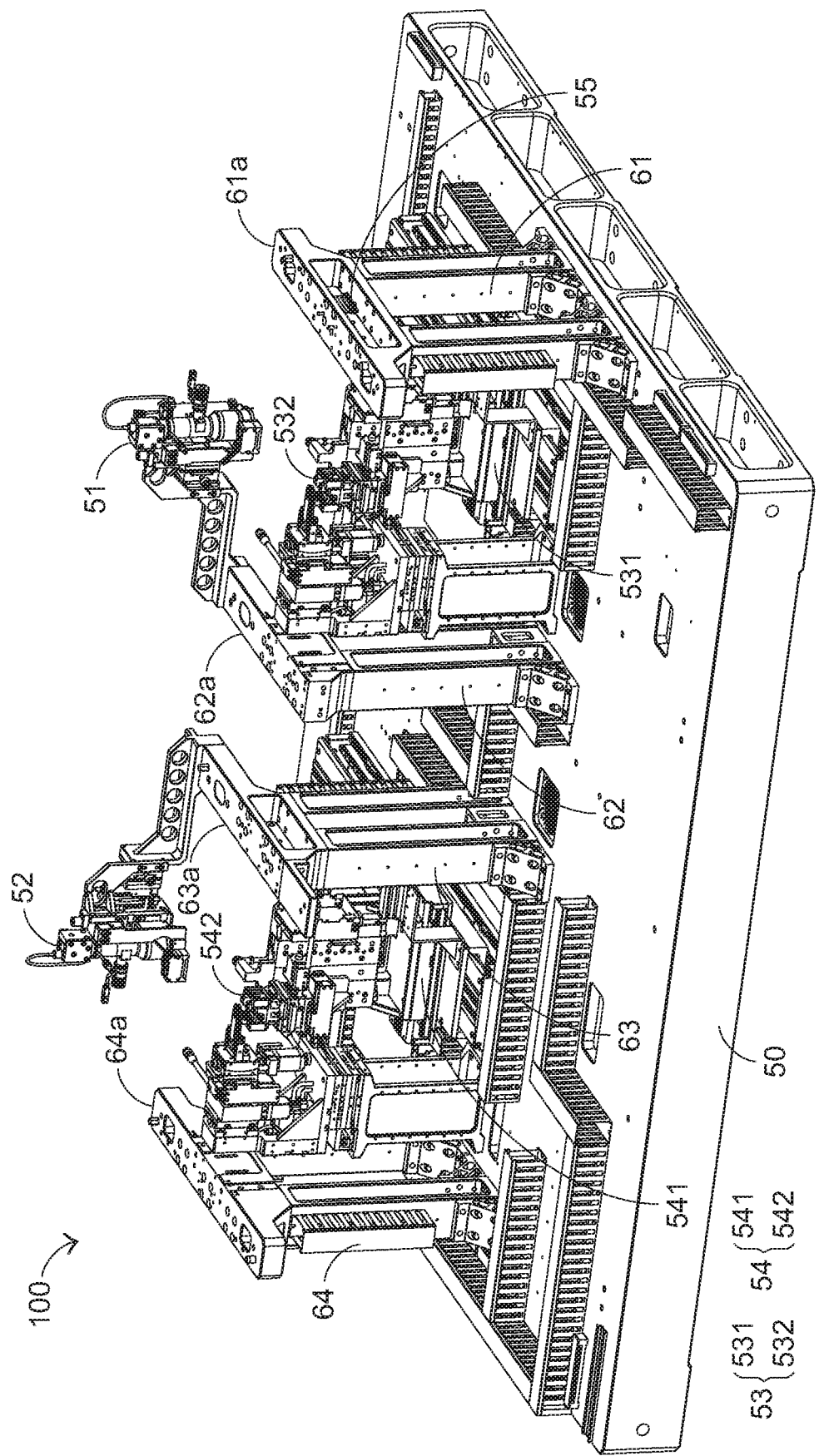
FIG. 1A is a schematic perspective view illustrating some components of an active alignment machine according to an embodiment of the present invention.
Figure 1B:
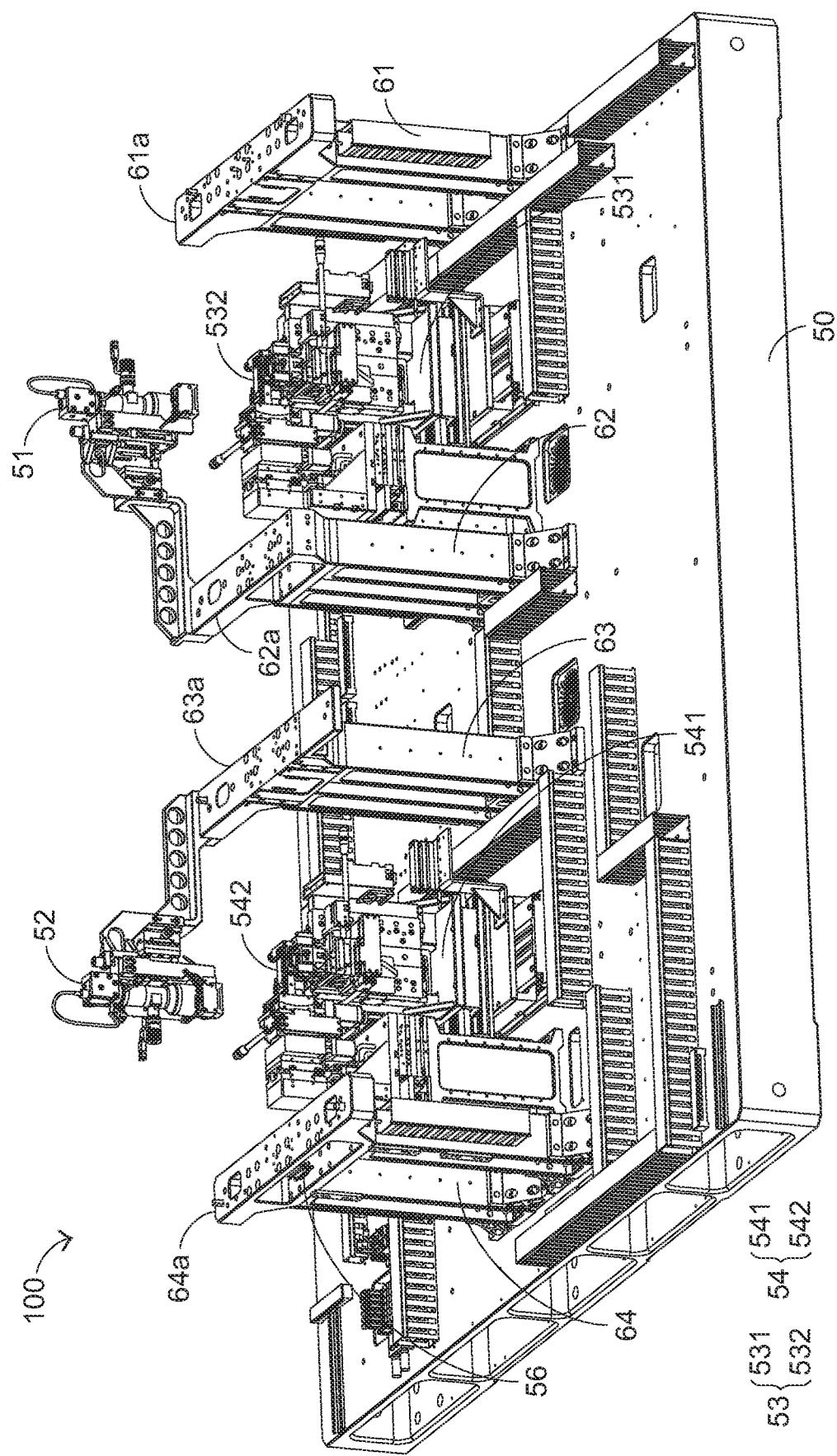
FIG. 1B is a schematic perspective view illustrating the active alignment machine as shown in FIG. 1A and taken along another viewpoint.
Figure 1C:
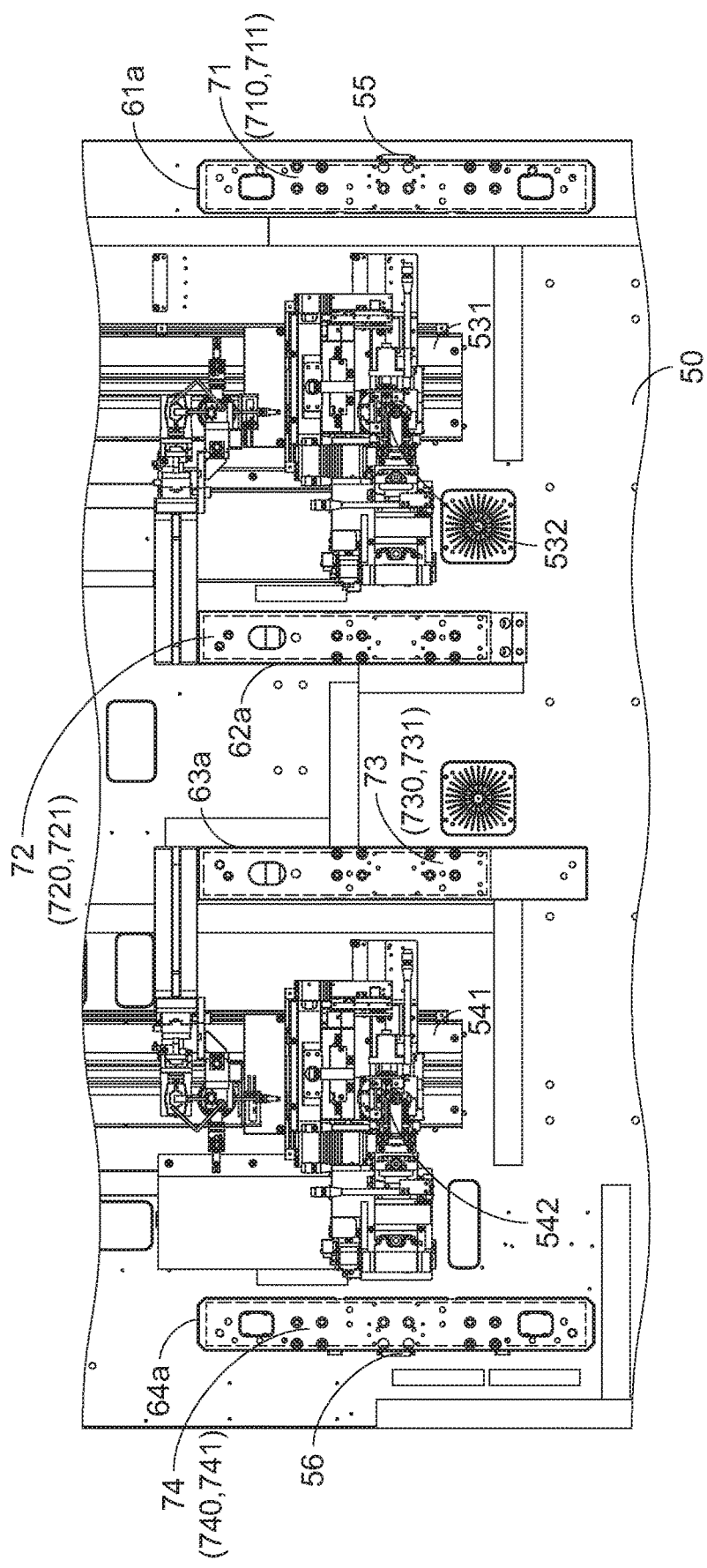
FIG. 1C is a schematic top view illustrating the active alignment machine as shown in FIG. 1A.

The present invention provides an active alignment machine. An embodiment of the active alignment machine will be described as follows. Please refer to FIGS. 1A, 1B and 1C. FIG. 1A is a schematic perspective view illustrating some components of an active alignment machine according to an embodiment of the present invention. FIG. 1B is a schematic perspective view illustrating the active alignment machine as shown in FIG. 1A and taken along another viewpoint. FIG. 1C is a schematic top view illustrating the active alignment machine as shown in FIG. 1A. In this embodiment, the active alignment machine 100 is used in an active alignment (AA) process for image sensors and lens elements of image pickup devices or products. In addition, the active alignment machine 100 can be used to perform the active alignment process on different types of image pickup devices or products.

As shown in FIGS. 1A, 1B and 1C, the active alignment machine 100 comprises a base 50. Moreover, the active alignment machine 100 further comprises a first pillar 61, a second pillar 62, a third pillar 63, a fourth pillar 64, a first distribution module 53 and a second distribution module 54, which are installed on the base 50. The first pillar 61 and the second pillar 62 belong to a group. The third pillar 63 and the fourth pillar 64 belong to another group. The first distribution module 53 is arranged between the first pillar 61 and the second pillar 62. The second distribution module 54 is arranged between the third pillar 63 and the fourth pillar 64.

The active alignment machine 100 further comprises a first placement device (not shown) and a second placement device (not shown), which are installed on the base 50. In an embodiment, the first placement device and the second placement device are located near the second pillar 62 and third pillar 63 and located outside these pillars 61~64. In addition, the first placement device and the second placement device are arranged between the second pillar 62 and third pillar 63.

In accordance with a feature of the present invention, the active alignment machine 100 is designed for performing an active alignment process on plural different types of image pickup devices or products in a modularized manner. Especially, different alignment modules are replaceable to be assembled with and disassembled from the corresponding group of pillars. Consequently, the functions of flexible configuration and rapid application can be achieved.

In this embodiment, the active alignment process for three types of products (i.e., a first-type product, a second-type product and a third-type product) will be described as follows. Correspondingly, the active alignment machine 100 further comprises a first alignment module, a second alignment module and a third alignment module, which are assembled according to the applications. The structures of the first alignment module, the second alignment module and the third alignment module will be described in FIGS. 2A to 5C.

In an embodiment, the constituents of the first distribution module 53 and the second distribution module 54 are identical. In another embodiment, some components are shared by the first distribution module 53 and the second distribution module 54. For example, the first distribution module 53 comprises a first transfer device (not shown), a gripping device 532 and a second transfer device 531.

In an embodiment, the first placement device is a lens pick and place device (also referred as a lens PNP device). The first placement device can pick up lens elements or mirror elements of the first-type product, the second-type product and the third-type product from a feed carrier through vacuum suction and then place these components on the first transfer device. The first transfer device is a lens unit transfer (LUT) device. The lens elements or mirror elements of the first-type product, the second-type product and the third-type product from the first placement device are transferred by the first transfer device.

In an embodiment, the second placement device is a sensor pick and place device (also referred as a sensor PNP device). The second placement device can pick up image sensors of the first-type product, the second-type product and the third-type product from the feed carrier through vacuum suction and then place these components on the second transfer device 531. The second transfer device is a sensor unit transfer (SUT) device. The image sensors of the first-type product, the second-type product and the third-type product from the second placement device are transferred by the second transfer device 531.

In an embodiment, the gripping device 532 is a lens gripper. After gripping the lens elements or mirror elements from the first transfer device, the gripping device 532 performs a six-axis rotation or translation and cooperatively works with the first alignment module, the second alignment module or the third alignment module to perform a focusing adjustment or an optical center alignment on the image sensors that are placed on the second transfer device 531. That is, the active alignment process is performed.

In an embodiment, the active alignment machine 100 further comprises two automated optical inspection and laser modules (also referred as AOI and Laser modules) 51 and 52. The two AOI and Laser modules 51 and 52 are respectively disposed on the second pillar 62 and the third pillar 63 for detecting the automatic alignment process.

The structures and the assembling methods of various alignment modules will be described later.

In the above embodiment, two groups of pillars are shown in the related drawings. However, the configurations of the first pillar 61 and the second pillar 62 and the configurations of the third pillar 63 and the fourth pillar 64 are similar. In other words, the active alignment machine 100 with a single group of pillars is feasible. In the above embodiment, greater portions of the configurations of the third pillar 63 and the fourth pillar 64 are identical to or partially symmetric to the configurations of the first pillar 61 and the second pillar 62. In the following descriptions of the alignment modules, the configurations of the first pillar 61 and the second pillar 62 are taken as examples, or the configurations of the third pillar 63 and the fourth pillar 64 are taken as examples. It is noted that the concepts of the present invention are not restricted.

Figure 2A:
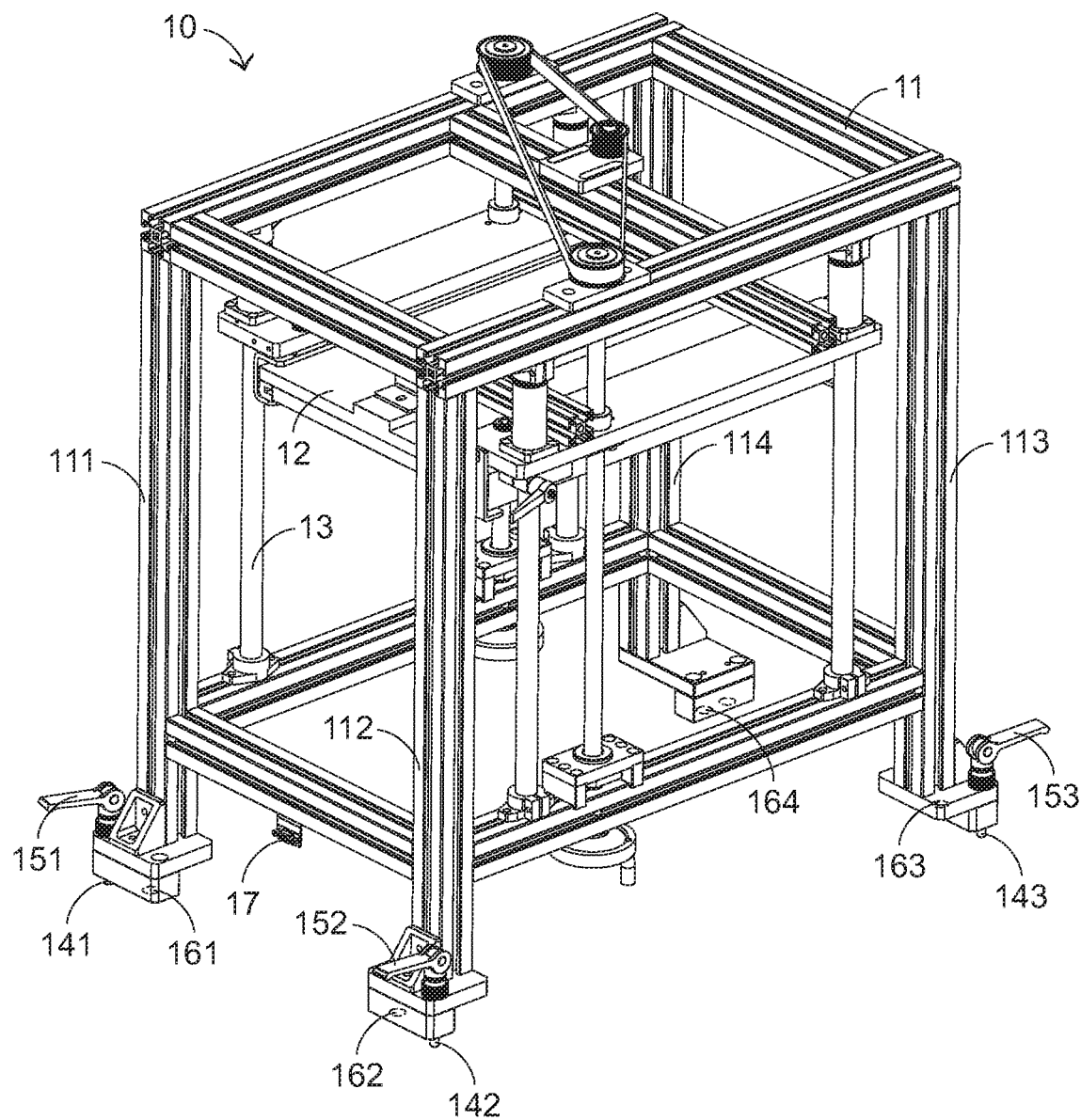
FIG. 2A is a schematic perspective view illustrating the first alignment module of the active alignment machine according to the embodiment of the present invention.
Figure 2B:
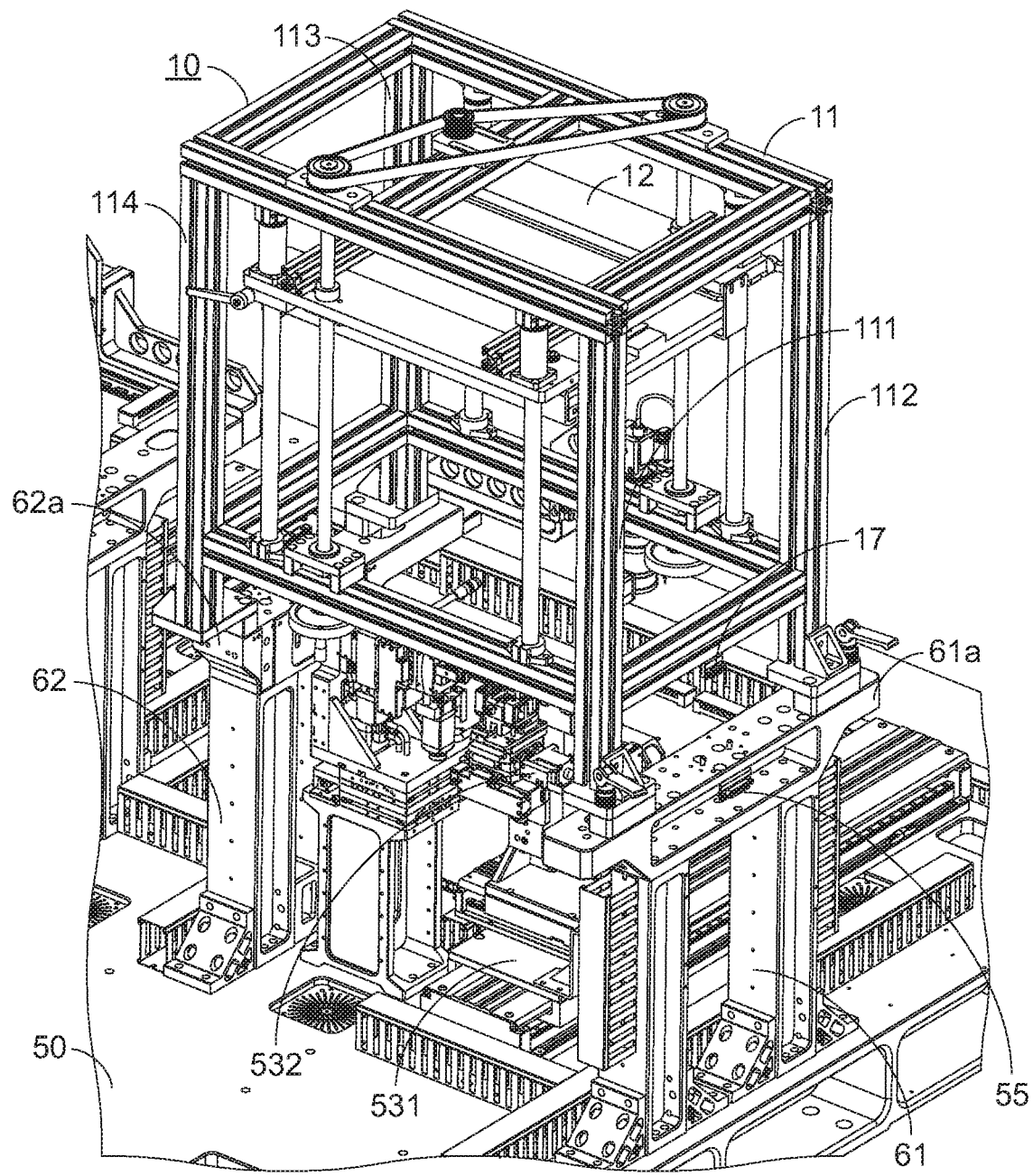
FIG. 2B is a schematic perspective view illustrating the installation of the first alignment module after being assembled.

Please refer to FIGS. 2A and 2B. FIG. 2A is a schematic perspective view illustrating the first alignment module of the active alignment machine according to the embodiment of the present invention. FIG. 2B is a schematic perspective view illustrating the installation of the first alignment module after being assembled. In this embodiment, the first alignment module 10 is applied to the first-type product. For example, the first-type product is a compact camera module (CCM). In addition, the first-type product comprises a lens component and an image sensor (not shown) that are ready to undergo the active alignment process.

As shown in FIGS. 2A and 2B, the first alignment module 10 comprises a first frame 11 and a light plate 12. The first frame 11 has a three-dimensional structure composed of plural long rods. In addition, the first frame 11 comprises four first support legs 111, 112, 113 and 114. The light plate 12 is installed on the first frame 11. The first frame 11 further comprises plural guide rails 13 to guide the light plate 12. Consequently, the light plate 12 can be moved on the first frame 11 to simulate a distance.

Please refer to FIGS. 1A, 1B and 1C again. The first pillar 61 has a first pillar top surface 61*a*. The second pillar 62 has a second pillar top surface 62*a*. The first support legs 111, 112, 113 and 114 can be assembled on the first pillar top surface 61*a* and the second pillar top surface 62*a*. Especially, the first pillar top surface 61*a* and the second pillar top surface 62*a* cooperatively support various assembling specifications, including the assembling specification of the first alignment module 10. The assembling specifications are related to the spacing interval between the two pillar top surfaces 61*a* and 62*a*, the lengths and widths of the two pillar top surfaces 61*a* and 62*a*, and the lengths and widths between the assembling points of the first support legs 111~114. Consequently, the first alignment module 10 can be securely placed on two pillar top surfaces 61*a* and 62*a*, and the first alignment module 10 will not fall down. In addition, the first pillar top surface 61*a* is at the same level with the second pillar top surface 62*a*.

Moreover, a first assembling interface 71 is disposed on the first pillar top surface 61*a*, and a second assembling interface 72 is disposed on the second pillar top surface 62*a*. The first support legs 111~114 can be assembled on the first assembling interface 71 and the second assembling interface 72. In an embodiment, the first assembling interface 71 comprises plural positioning holes 710 and plural positioning posts 711, and the second assembling interface 72 comprises plural positioning holes 720 and plural positioning posts 721. The plural first support legs 111~114 comprise plural first locking elements 141, 142, 143, plural first quick release elements 151, 152, 153, and plural positioning holes 161, 162, 163, 164. The plural positioning holes 161, 162, 163 and 164 are formed in the bottom side and indicated by dotted lines. The plural positioning holes 710 and 720 are aligned with the corresponding first locking elements 141~143 and assembled with the corresponding first locking elements 141~143. The plural positioning posts 711 and 721 are aligned with the corresponding positioning holes 161~164 and assembled with the corresponding positioning holes 161~164. The plural first locking elements 141~143 can be fixed or disassembled through the plural first quick release elements 151~153.

In accordance with another feature of the present invention, the plural positioning holes 710 and the plural positioning posts 711 of the first assembling interface 71 are distributed on the two end regions and the middle region of the first pillar top surface 61*a*, and the plural positioning holes 720 and the plural positioning posts 721 of the second assembling interface 72 are distributed on the two end regions and the middle region of the second pillar top surface 62*a*. In other words, the installation positions and the numbers of the positioning holes 710, 720 and the positioning posts 711, 721 can be determined according to the assembling structure of the alignment module to be applied. Consequently, the corresponding assembling specifications can be provided, or the alignment module to be applied can be assembled on the corresponding pillars through the suitable positioning holes and/or positioning posts.

In an embodiment, the two first support legs 111 and 112 are assembled on the first pillar top surface 61*a*, and the other two first support legs 113 and 114 are assembled on the second pillar top surface 62*a*. Moreover, each of the first support legs 111, 112 and 113 comprises one locking element and one quick release element. For examples, the first locking elements 141~143 are thumb screws. The first quick release elements 151~153 are formed on the corresponding first locking elements 141~143.

As mentioned above, some positioning holes 710, 720 and some positioning posts 711, 721 at the two end parts of the first pillar top surface 61*a* and the two end parts of the second pillar top surface 62*a* are assembled with the corresponding first locking elements 141~143 and the corresponding positioning holes 161~164. The sizes and positions of corresponding components match each other. After the first support legs 111~114 are placed on the designated positions, the first locking elements 141~143 are inserted into the corresponding positioning holes 710, 720, and the positioning posts 711, 721 are inserted into the corresponding positioning holes 161~164. By tightening the screw structures and pressing down the hand tool parts of the first quick release elements 151~153, the procedure of assembling and fixing the associated components is completed.

For disassembling the first alignment module 10, the above procedure is operated reversely. By loosening the screw structures and pulling up the hand tool parts of the first quick release elements 151~153, the first locking elements 141~143 are detached from the corresponding positioning holes 710 and 720. Then, the plural first support legs 111~114 are removed from the first pillar top surface 61*a* and the second pillar top surface 62*a*. Consequently, the first alignment module 10 can be disassembled quickly.

In the above embodiment, the positioning holes, the positioning posts, the locking elements (e.g., thumb screws), the quick release elements and associated structures or components are used to implement the assembling procedures. It is noted that the concepts of the present invention are not restricted. That is, other embodiments or variant examples may be used to complete the assembling procedures. For example, in another embodiment, screws and nuts are used to complete the assembling and fixing procedures. Alternatively, in another embodiment, the positioning posts and the quick release elements are not used. Alternatively, the fixing procedure is completed through the engagement of tenons.

The components of transferring electric power and signals will be described as follows. In an embodiment, the active alignment machine 100 further comprises a base transmission interface 55. As shown in FIGS. 1A, 1C and 2B, the base transmission interface 55 is installed on the first pillar 61 and located near the first pillar top surface 61*a*. The base transmission interface 55 is an integrated power and signal connection port. In addition, the base transmission interface 55 can be connected to a back-end power supply and control platform (e.g., a computer) through the base 50. In an embodiment, the first alignment module 10 further comprises a first transmission interface 17. As shown in FIGS. 2A and 2B, the first transmission interface 17 is installed on the first frame 11. Particularly, the first transmission interface 17 is installed on a crossbar between the support leg 111 and the support leg 112. The first transmission interface 17 is electrically connected with the base transmission interface 55 through a transmission wire (not shown). Consequently, an associated driving module installed on the first frame 11 can be controlled to drive the movement of the light plate 12, and associated signals can be transferred through the first transmission interface 17 and the base transmission interface 55.

In an embodiment, the base transmission interface 55 is a 25-pin (DB25 pin) connector plug (i.e., a male connector), and the first transmission interface 17 is a 9-hole (DB9 hole) connector socket (i.e., a female connector). Correspondingly, a first end of the transmission wire is formed as a 25-hole (DB25 hole) connector socket, and a second end of the transmission wire is formed as a 9-pin (DB9 pin) connector plug. Consequently, the transmission wire can be adaptively connected with the base transmission interface 55 and the first transmission interface 17.

It is noted that the example of designing the connector socket or the connector plug may be varied according to the practical requirements. Alternatively, in case that the application or the assembling method is different, the base transmission interface is installed on the second pillar 62. When the alignment module to be applied needs to be replaced, it is necessary to disassemble the first alignment module 10 while removing the transmission wire.

A procedure of performing the active alignment process on the first-type product through the cooperation of the first alignment module 10 and the first distribution module 53 will be described as follows. Firstly, a calibration chart is formed on the light plate 12. In addition, plural square characteristic points are distributed on a middle region and four corners in a specified area of the calibration chart. The plural characteristic points are used as benchmark for the focusing adjustment of the first-type product. The light plate 12 is moved upwardly or downwardly to simulate the distance. In addition, the calibration chart is shown on the light plate 12 to be viewed by the user. The lens element of the first-type product is gripped by the gripping device 532. The image sensor of the first-type product is transferred by the second transfer device 531. After the image sensor is enabled, the lens element is adjusted by the gripping device 532. Consequently, the calibration chart on the light plate 12 is focused by the image sensor. By analyzing the focusing result, the user can confirm whether the active alignment process is completed.

Under the above assembling condition, the active alignment process can be further modified. For example, the active alignment machine can simulate a long distance (e.g., a distance larger than 90 centimeters) or simulate an infinite distance in order to perform the active alignment process on the product.

Figure 3A:
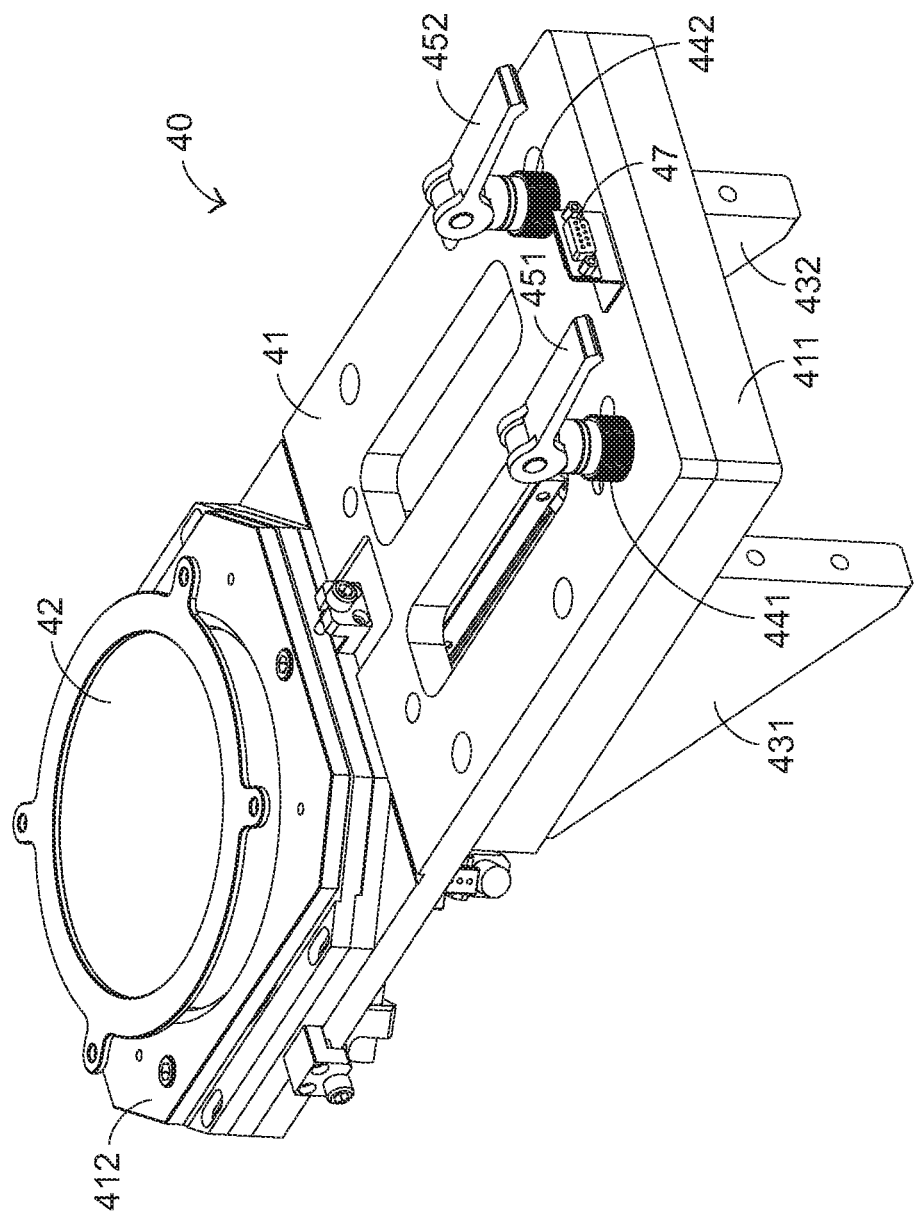
FIG. 3A is a schematic perspective view illustrating a relay lens device of the active alignment machine according to the embodiment of the present invention.
Figure 3B:
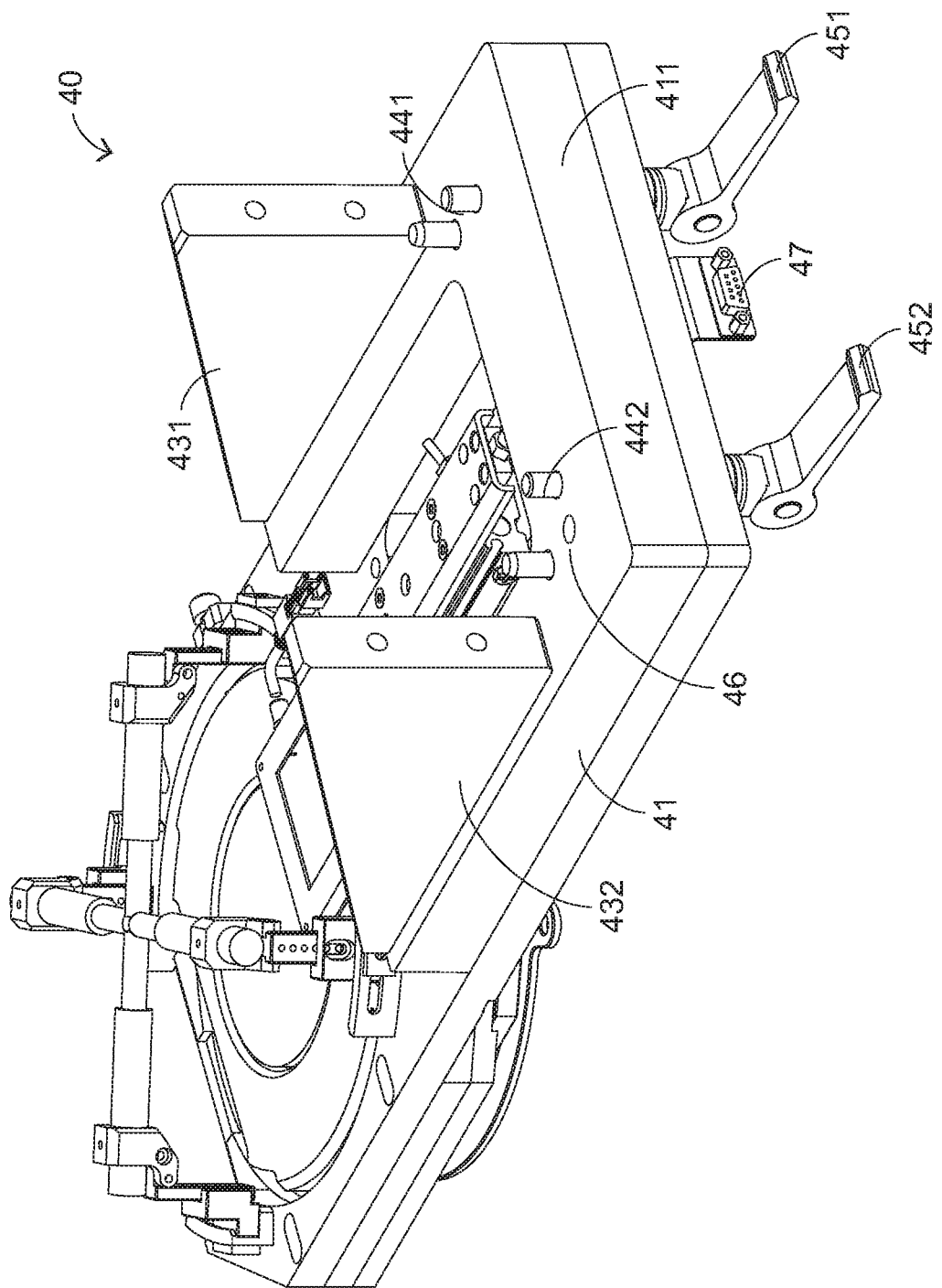
FIG. 3B is a schematic perspective view of the relay lens device as shown in FIG. 3A after being turned upside down by 180 degrees.
Figure 3C:
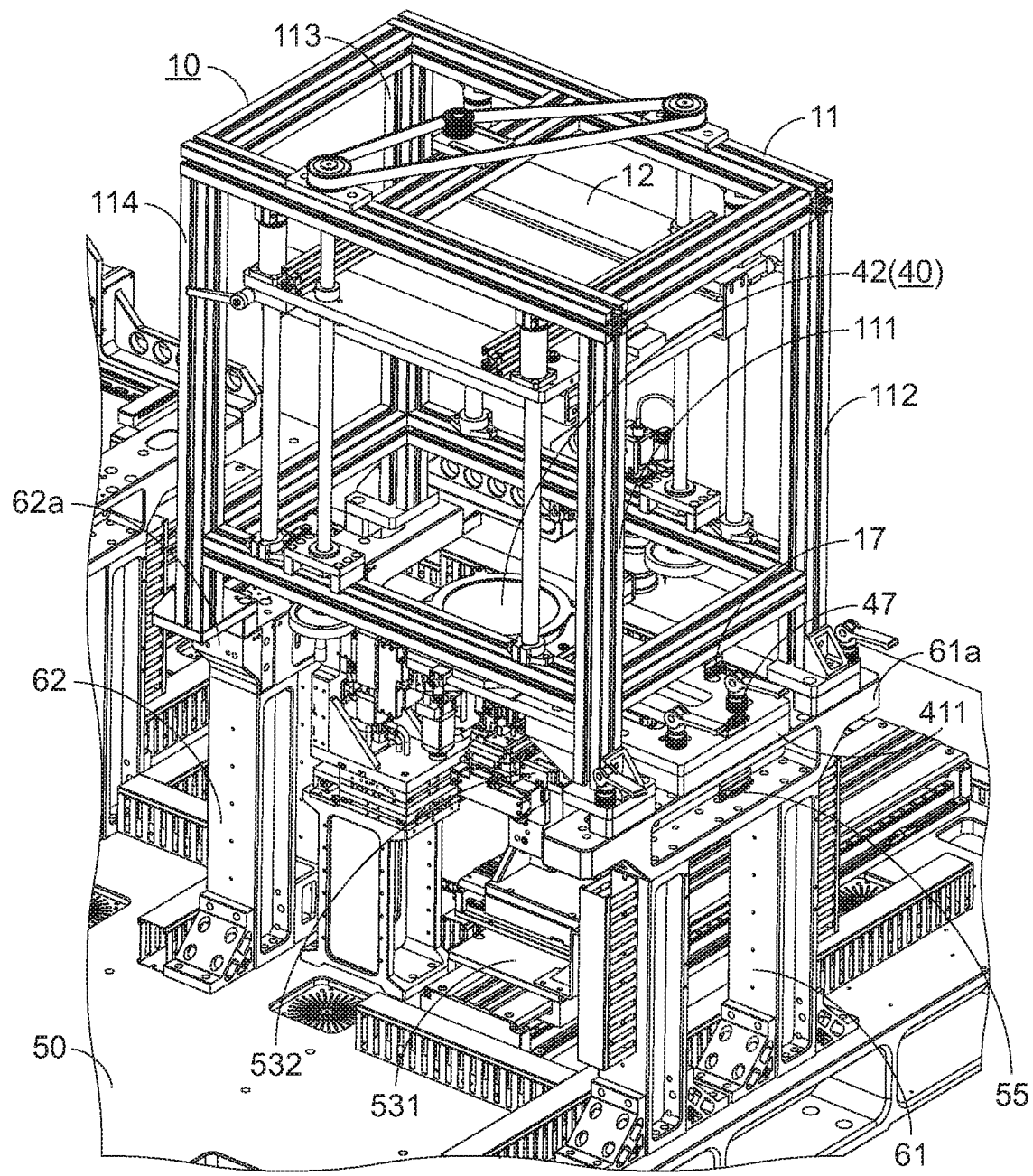
FIG. 3C is a perspective view illustrating the installation of the relay lens device.

Please refer to FIGS. 3A, 3B and 3C. FIG. 3A is a schematic perspective view illustrating a relay lens device of the active alignment machine according to the embodiment of the present invention. FIG. 3B is a schematic perspective view of the relay lens device as shown in FIG. 3A after being turned upside down by 180 degrees. FIG. 3C is a perspective view illustrating the installation of the relay lens device. In an embodiment, the first alignment module 10 further comprises a relay lens device 40. The relay lens device 40 can be used to simulate a long distance or an infinite distance. It is noted that the relay lens device is optionally used according to the practical requirements of the products. If the product needs the long-distance simulation, it is necessary to additionally install the relay lens device 40. Whereas, if the long-distance simulation is not needed, the movement of the light plate 12 is feasible.

As shown in FIGS. 3A, 3B and 3C, the relay lens device 40 comprises an assembling plate 41. A lateral edge 411 of the assembling plate 41 is assembled with the first assembling interface 71. In an embodiment, the lateral edge 411 of the assembling plate 41 comprises plural lens locking elements 441, 442, plural lens quick release elements 451, 452 (e.g., two lens quick release elements) and a positioning hole 46. The positioning holes 710 are aligned with the corresponding lens locking elements 441, 442 and assembled with the corresponding lens locking elements 441, 442. One of the positioning posts 711 is aligned with the positioning hole 46 and assembled with the positioning hole 46. The plural lens locking elements 441 and 442 can be fixed or disassembled through the lens quick release elements 451 and 452.

In an embodiment, the lens locking elements 441 and 442 are thumb screws, and the lens quick release elements 451 and 452 are formed on the corresponding lens locking elements 441 and 442. In an embodiment, some positioning holes 710 and a positioning post 711 at the middle region of the first pillar top surface 61*a* are assembled with the corresponding lens locking elements 441 and 442 and the positioning hole 46. After the lateral edge 411 of the assembling plate 41 is placed on the designated position, the lens locking elements 441 and 442 are inserted into the corresponding positioning holes 710, and the positioning post 711 is inserted into the positioning hole 46. By tightening the screw structures and pressing down the hand tool parts of the lens quick release elements 451 and 452, the procedure of assembling and fixing the associated components is completed. For disassembling the relay lens device 40, the above procedure is operated reversely. For brevity, the disassembling procedure is not redundantly described herein.

In an embodiment, the relay lens device 40 comprises a relay lens 42. The relay lens 42 is installed on another lateral edge 412 of the assembling plate 41 for providing the distance simulation function. After the relay lens device 40 is assembled, the relay lens 42 is approximately in the center of the first pillar 61 and the second pillar 62. Consequently, the relay lens device 40 is aligned with the gripping device 532 and the second transfer device 531 at the underlying positions, and the relay lens device 40 is aligned with the light plate 12 at the overlying position. For guiding the lateral edge 411 of the assembling plate 41 to be assembled, the bottom side of the assembling plate 41 is further equipped with two positioning plates 431 and 432. When the two positioning plates 431 and 432 are contacted with the first pillar top surface 61a and the lateral edge 411 of the assembling plate 41 is placed on the first pillar top surface 61a, the two lens locking elements 441 and 442 can be smoothly guided to the corresponding positioning holes 710.

In the above embodiment, the relay lens device 40 is assembled with the first assembling interface 71. It is noted that numerous modifications and alterations may be made while retaining the teachings of the invention. For example, in another embodiment, the relay lens device 40 is assembled with the second assembling interface 72. That is, the relay lens device 40 is installed on the second pillar top surface 62a. The relay lens device 40 is also able to simulate the distance. Moreover, the positioning holes, the positioning posts, the locking elements (e.g., thumb screws), the quick release elements and associated structures or components for achieving the assembling function are not restricted.

Moreover, the relay lens device 40 further comprises a lens transmission interface 47. As shown in FIGS. 3A, 3B and 3C, the lens transmission interface 47 is installed on the lateral edge 411 of the assembling plate 41. The lens transmission interface 47 is electrically connected with the base transmission interface 55. Consequently, electric power can be provided to the UV lamp of the relay lens device 40. In an embodiment, the lens transmission interface 47 is a 9-hole (DB9 hole) connector socket.

The first transmission interface 17 and the lens transmission interface 47 need to be electrically connected with each other. In case that only a single base transmission interface 55 is installed, one transmission wire is shared by the first transmission interface 17 and the lens transmission interface 47. For example, two 9-pin (DB9 pin) connector plugs are formed on a first end of the transmission wire and electrically connected with the first transmission interface 17 and the lens transmission interface 47, respectively. Moreover, a 25-hole (DB25 hole) connector socket is formed on a second end of the transmission wire and electrically connected with a 25-pin (DB25 pin) connector plug (i.e., the base transmission interface 55).

Figure 4A:
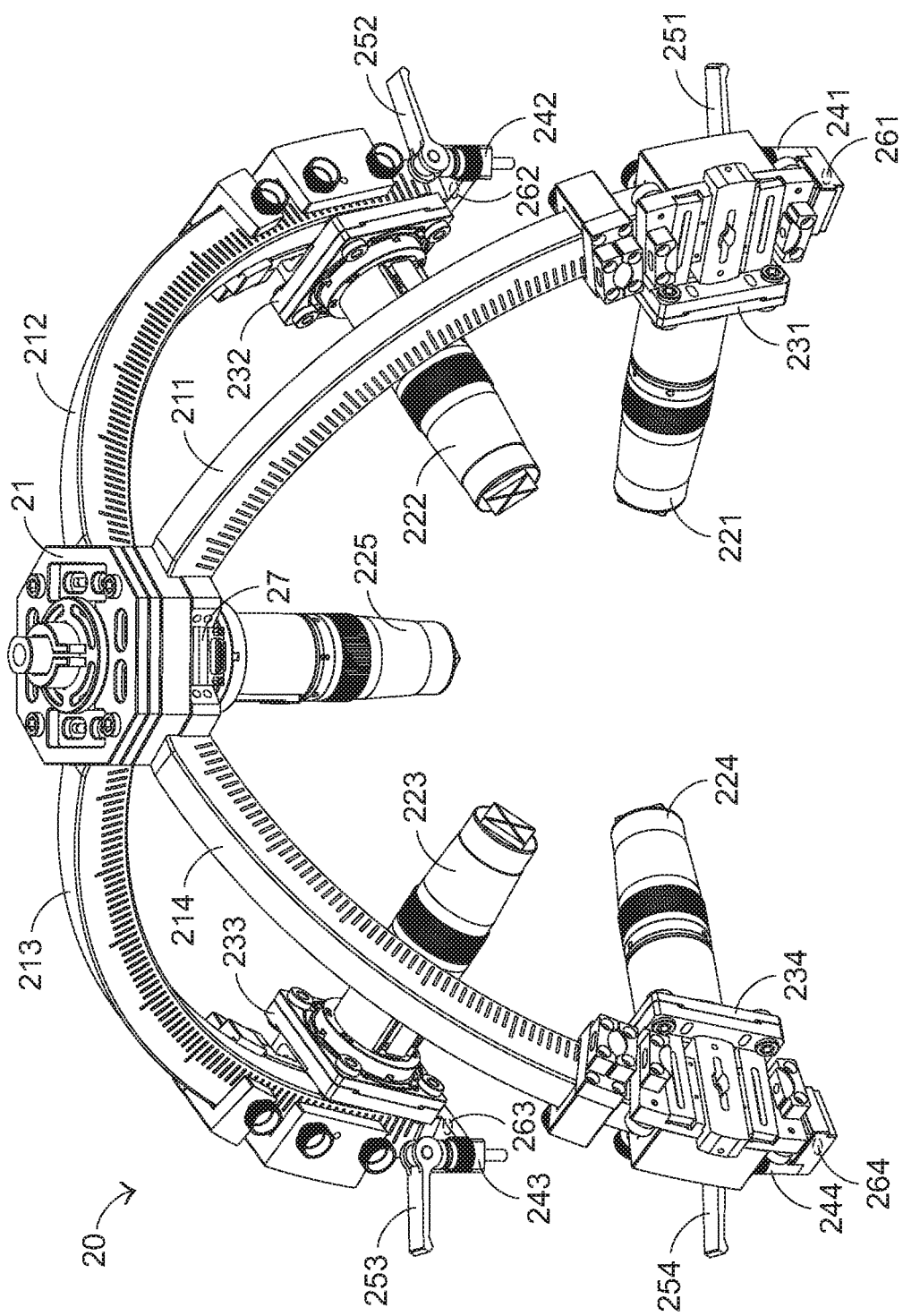
FIG. 4A is a schematic perspective view illustrating the second alignment module of the active alignment machine according to the embodiment of the present invention.
Figure 4B:
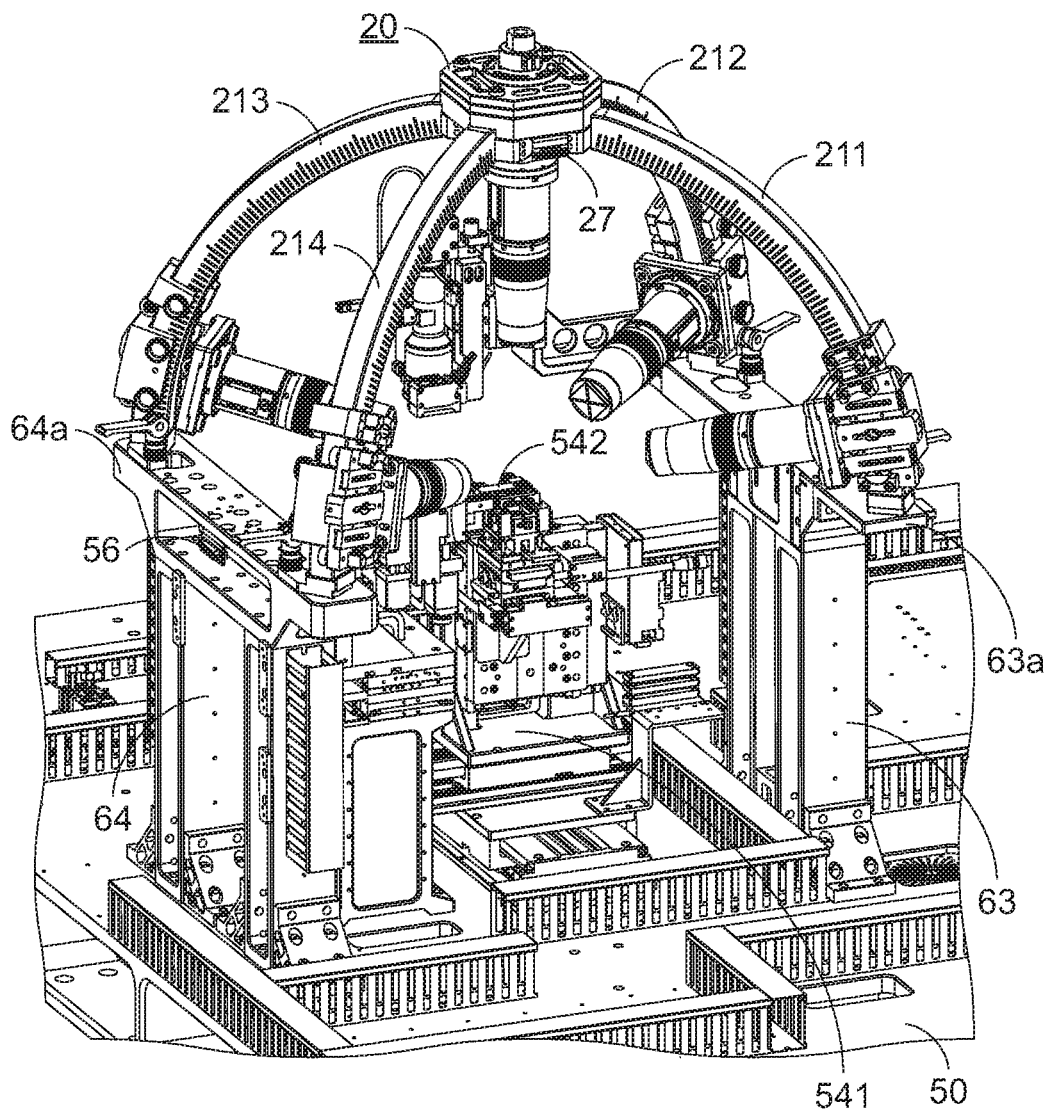
FIG. 4B is a schematic perspective view illustrating the installation of the second alignment module after being assembled.

Please refer to FIGS. 4A and 4B. FIG. 4A is a schematic perspective view illustrating the second alignment module of the active alignment machine according to the embodiment of the present invention. FIG. 4B is a schematic perspective view illustrating the installation of the second alignment module after being assembled. In this embodiment, the second alignment module 20 is applied to the second-type product. For example, the second-type product is a vehicle wide-angle module. In addition, the second-type product comprises a lens component and an image sensor (not shown) that are ready to undergo the active alignment process.

As shown in FIGS. 4A and 4B, the second alignment module 20 comprises a second frame 21 and plural collimators 221, 222, 223, 224 and 225. The second frame 21 has a dome-shaped structure composed of four curved rod tracks. That is, the second frame 21 comprises four second support legs 211, 212, 213 and 214. The plural collimators 221~225 are evenly distributed on the second frame 21. In this embodiment, the second alignment module 20 comprises five collimators. The collimator 225 is located at the junction between the second support legs 211~214. The four collimators 221~224 are respectively installed on the corresponding second support legs 211~214 for performing the active alignment process. Especially, the second support legs 211~214 have fixing parts 231, 232, 233 and 234, respectively. The fixing parts 231, 232, 233 and 234 are sheathed around and fixed on the corresponding second support legs 211, 212, 213 and 214, respectively.

Please refer to FIGS. 4A and 4B again. This assembling procedure is applied to the third pillar 63 and the fourth pillar 64. Similarly, the first pillar 63 has a third pillar top surface 63a. The fourth pillar 64 has a fourth pillar top surface 64a. Especially, the third pillar top surface 63a and the fourth pillar top surface 64a cooperatively support various assembling specifications, including the assembling specification of the second alignment module 20. In addition, the third pillar top surface 63a is at the same level with the fourth pillar top surface 64a.

Moreover, a third assembling interface 73 is disposed on the third pillar top surface 63a, and a fourth assembling interface 74 is disposed on the fourth pillar top surface 64a. The third assembling interface 73 comprises plural positioning holes 730 and plural positioning posts 731, and the fourth assembling interface 74 comprises plural positioning holes 740 and plural positioning posts 741 (see FIG. 1C). The structures of the third assembling interface 73 and the fourth assembling interface 74 are similar to those of the first assembling interface 71 and the second assembling interface 72. Moreover, the active alignment machine 100 further comprises another base transmission interface 56. The base transmission interface 56 is installed on the fourth pillar 64 and located near the fourth pillar top surface 64a. The base transmission interface 56 can be electrically connected with the corresponding alignment module through a transmission wire.

The second support legs 211~214 are assembled with the third pillar top surface 63a and the fourth pillar top surface 64a. That is, the second support legs 211~214 are assembled with the third assembling interface 73 and the fourth assembling interface 74. In an embodiment, the second support legs 211~214 comprise plural second locking elements 241, 242, 243, 244, plural second quick release elements 251, 252, 253, 254, and plural positioning holes 261, 262, 263, 264. The plural positioning holes 261, 262, 263 and 264 are formed in the bottom side and indicated by dotted lines. The plural positioning holes 730 and 740 are aligned with the corresponding second locking elements 241~244 and assembled with the corresponding second locking elements 241~244. The plural positioning posts 731 and 741 are aligned with the corresponding positioning holes 261~264 and assembled with the corresponding positioning holes 261~264. The plural second locking elements 241~244 can be fixed or disassembled through the plural second quick release elements 251~254.

In an embodiment, the two second support legs 211 and 212 are assembled on the third pillar top surface 63a, and the other two second support legs 213 and 214 are assembled on the fourth pillar top surface 64a. Moreover, each of the second support legs 211~214 comprises one locking element and one quick release element. For example, the second locking elements 241~244 are thumb screws. The second quick release elements 251~254 are formed on the corresponding second locking elements 241~244.

As mentioned above, some positioning holes 730, 740 and some positioning posts 731, 731 at the two end parts of the third pillar top surface 63a and the two end parts of the fourth pillar top surface 64a are assembled with the corresponding second locking elements 241~244 and the corresponding positioning holes 261~264. After the second support legs 211~214 are placed on the designated positions, the second locking elements 241~244 are inserted into the corresponding positioning holes 730, 740, and the positioning posts 731, 741 are inserted into the corresponding positioning holes 261~264. By tightening the screw structures and pressing down the hand tool parts of the second quick release elements 251~254, the procedure of assembling and fixing the associated components is completed. For disassembling the second alignment module, the above procedure is operated reversely. For brevity, the disassembling procedure is not redundantly described herein. Moreover, the positioning holes, the positioning posts, the locking elements (e.g., thumb screws), the quick release elements and associated structures or components for achieving the assembling function are not restricted.

As mentioned above, the second alignment module 20 is applied to the vehicle wide-angle module with a view angle larger than 80 degrees (or even larger than 130 degrees). Similarly, the second distribution module 54 comprises a first transfer device (not shown), a gripping device 542 and a second transfer device 541. The five collimators 221~225 are located over the gripping device 542 and the second transfer device 541 to cover the gripping device 542 and the second transfer device 541. The collimator 225 located at the topmost position of the second frame 21 is located at the center and kept immobile. The installation positions of the four collimators 221~224 on the corresponding second support legs 211~214 are related to the field of view (FOV) settings of the image sensors to be subjected to the active alignment process.

Consequently, before the active alignment process, the four collimators 221~224 can be corrected for the field of view. Generally, the field of view (FOV) settings for different products may be different. During the correction, the center position of the image frame is firstly calculated, and a circular surface is correspondingly drawn in the space. Then, the four collimators 221~224 and their fixing parts 231~234 are adjusted along the corresponding second support legs 211~214 and moved to the circular surface. Consequently, the FOV correction can be completed according to the FOV settings. After the correction, the collimators 221~224 are maintained at their positions and kept immobile. Consequently, the subsequent procedures of the active alignment process can be performed.

In an embodiment, the second alignment module 20 further comprises a second transmission interface 27. As shown in FIGS. 4A and 4B, the second transmission interface 27 is installed on the second frame 21. Particularly, the second transmission interface 27 is located at the junction between the second support legs 211~214. Similarly, these collimators 221~225 have to be electrically connected. In case that only a single base transmission interface 56 is installed, these collimators 221~225 are integrated to use the single second transmission interface 27 as an external electric connection port. The second transmission interface 27 is electrically connected with the base transmission interface 56 through a transmission wire (not shown). Consequently, the focusing adjustment of the collimators 221~225 can be performed, and associated signals can be transferred through the second transmission interface 27 and the base transmission interface 56.

In an embodiment, the second transmission interface 27 is a 15-hole (DB15 hole) connector socket, and the base transmission interface 56 is a 25-pin (DB25 pin) connector plug. Correspondingly, a first end of the transmission wire is formed as a 15-pin (DB15 pin) connector plug, and a second end of the transmission wire is formed as a 25-hole (DB25 hole) connector socket.

A procedure of performing the active alignment process on the second-type product through the cooperation of the second alignment module 20 and the second distribution module 54 will be described as follows. The inner portion of each of the collimators 221~225 comprises a light plate element that is similar to the light plate 12. Firstly, a calibration chart is formed on the light plate element. As mentioned above, the calibration chart of the light plate 12 has plural square characteristic points. In contrast, the calibration chart in the light plate element of each of the collimators 221~225 comprises plural quarter-circle characteristic points. These characteristic points are used as benchmark for the focusing adjustment of the second-type product. These light plate elements can be used to simulate the distance. In addition, the calibration chart is shown on the light plate element to be viewed by the user. The procedure of performing the focusing adjustment by the gripping device 542 is similar to that for the first alignment module 10, and not redundantly described herein.

In the above embodiment, the second alignment module 20 is assembled with the third pillar 63 and the fourth pillar 64. It is noted that numerous modifications and alterations may be made while retaining the teachings of the invention. For example, in case that the configurations of the first pillar 61 and the second pillar 62 are similar to the configurations of the third pillar 63 and the fourth pillar 64, the second alignment module 20 is properly adjusted to be assembled with the first pillar 61 and the second pillar 62. Alternatively, the first alignment module 10 is assembled with the third pillar 63 and the fourth pillar 64. Consequently, different alignment modules can be replaceable to be assembled with and disassembled from the corresponding group of pillars. In another embodiment, the configurations of the first pillar and the second pillar are completely identical to the configurations of the third pillar and the fourth pillar in order to support various assembling specifications.

Figure 5A:
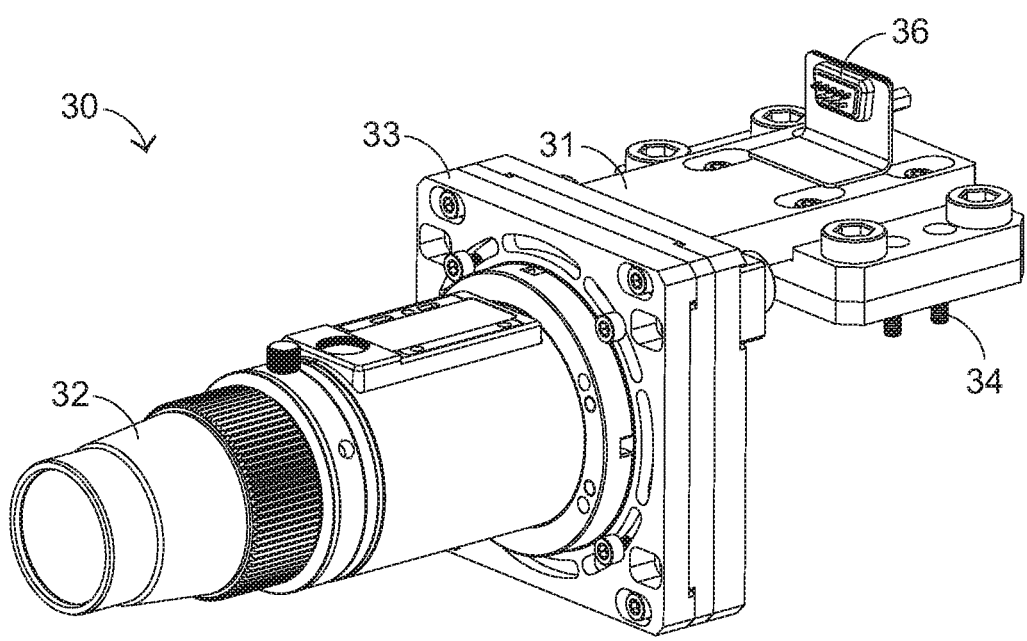
FIG. 5A is a schematic perspective view illustrating the third alignment module of the active alignment machine according to the embodiment of the present invention.
Figure 5B:
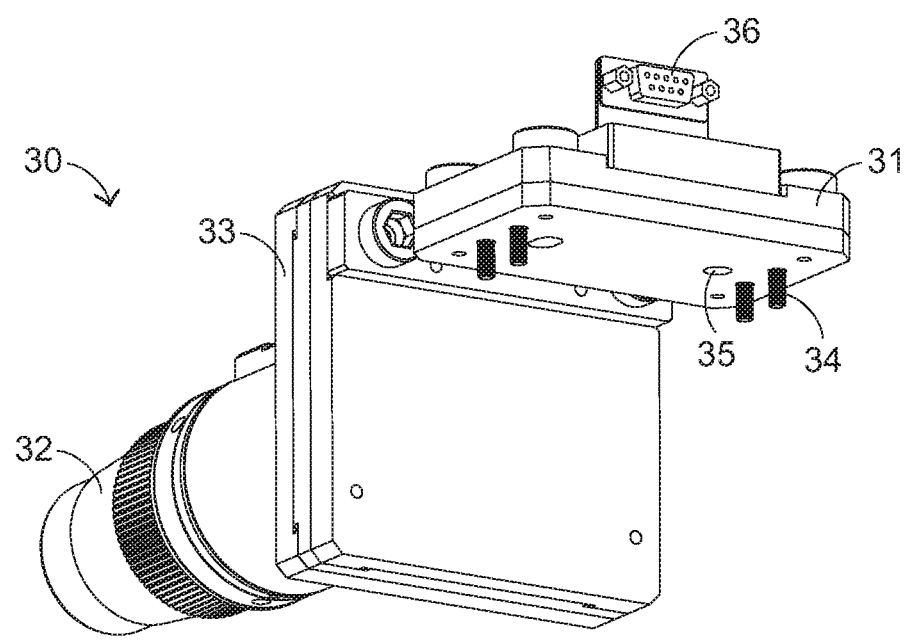
FIG. 5B is a schematic perspective view illustrating the third alignment module as shown in FIG. 5A and taken along another viewpoint.
Figure 5C:
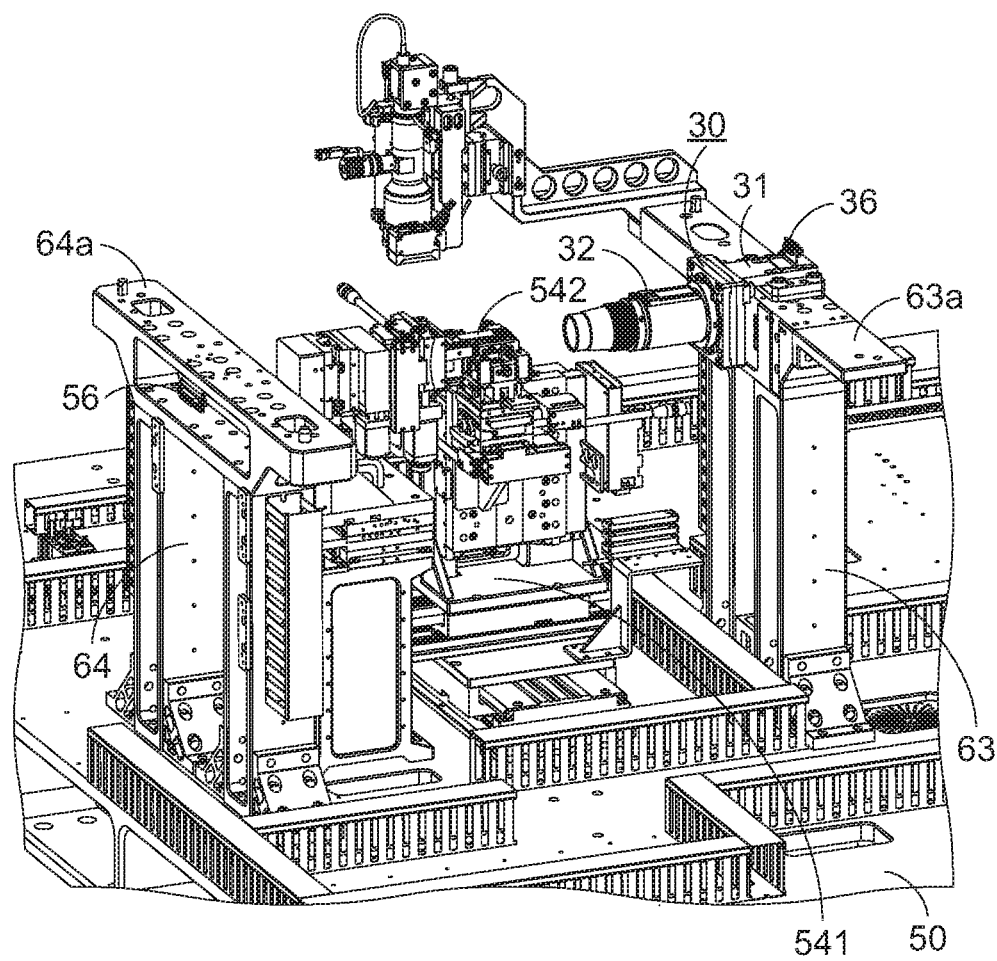
FIG. 5C is a schematic perspective view illustrating the installation of the third alignment module on the third pillar.

Please refer to FIGS. 5A, 5B and 5C. FIG. 5A is a schematic perspective view illustrating the third alignment module of the active alignment machine according to the embodiment of the present invention. FIG. 5B is a schematic perspective view illustrating the third alignment module as shown in FIG. 5A and taken along another viewpoint. FIG. 5C is a schematic perspective view illustrating the installation of the third alignment module on the third pillar. In this embodiment, the third alignment module 30 is applied to the third-type product. For example, the third-type product is a folded camera module. In addition, the second-type product comprises a lens assembly and an image sensor (not shown) that are ready to undergo the active alignment process.

As shown in FIGS. 5A, 5B and 5C, the third alignment module 30 comprises a collimator 32 and an assembling plate 31. The assembling plate 31 is connected with a lateral plate 33 of the collimator 32. This assembling procedure is applied to the third pillar 63. Especially, the third pillar top surface 63a and the fourth pillar top surface 64a cooperatively support various assembling specifications, including the assembling specification of the third alignment module 30. In an embodiment, the assembling plate 31 is assembled with the third pillar top surface 63a (i.e., assembled on the third assembling interface 73). In an embodiment, the assembling plate 31 comprises plural third locking elements 34 and plural positioning holes 35. The plural positioning holes 730 are aligned with the corresponding third locking elements 34 and assembled with the corresponding third locking elements 34. The plural positioning holes 731 are aligned with the corresponding positioning holes 35 and assembled with the corresponding positioning holes 35.

In an embodiment, the third locking elements 34 are securing screws, which can be tightened by using a screwdriver or similar tool. In an embodiment, the positioning holes 730 and the positioning posts 711 at the middle region of the third pillar top surface 63a are assembled with the corresponding third locking elements 34 and the positioning hole 35. After the assembling plate 31 is placed on the designated position, the third locking elements 34 are inserted into the corresponding positioning holes 730, and the positioning posts 731 are inserted into the positioning holes 35. For disassembling the third alignment module 30, the above procedure is operated reversely. By using the screwdriver to loosen the screw structures, the third alignment module 30 can be disassembled quickly.

In the above embodiment, the third alignment module 30 is assembled with the third pillar top surface 63a (i.e., assembled on the third assembling interface 73). It is noted that numerous modifications and alterations may be made while retaining the teachings of the invention. For example, in another embodiment, the third alignment module 30 is assembled with the fourth pillar top surface 64a (i.e., assembled on the fourth assembling interface 73). Alternatively, the third alignment module 30 is assembled with the first pillar top surface 61a (i.e., assembled on the first assembling interface 71), or the third alignment module 30 is assembled with the second pillar top surface 62a (i.e., assembled on the second assembling interface 72). Moreover, the positioning holes, the positioning posts, the locking elements (e.g., securing screws), and associated structures or components for achieving the assembling function are not restricted.

As mentioned above, only a collimator and the corresponding gripper 542 are sufficient to perform the image center active alignment on the folded camera module. The folded camera module is a lens structure that can perform high-magnification telephoto in the body of the applied device. In accordance with the design principle of the folded camera module, triangular prisms or reflective mirrors are used to reflect light beams to plural lenses that are movable to achieve the optical zooming function, and then the reflected light beams are sensed by the image sensors. In other words, the objects gripped by the gripper 542 are the mirror elements (e.g., triangular prisms or reflective mirrors) of the third-type product, and the objects transferred by the second transfer device 541 is the lens elements and the image sensors of the third-type product.

In an embodiment, the third alignment module 30 further comprises a third transmission interface 36. As shown in FIGS. 5A, 5B and 5C, the third transmission interface 36 is installed on the assembling plate 31. The third transmission interface 36 is electrically connected with the base transmission interface 56 through a transmission wire (not shown). Consequently, electric power can be provided to the collimator 32. In an embodiment, the third transmission interface 36 is a 9-hole (DB9 hole) connector socket. Correspondingly, a first end of the transmission wire is formed as a 9-pin (DB9 pin) connector plug, and a second end of the transmission wire is formed as a 25-hole (DB25 hole) connector socket.

A procedure of performing the active alignment process on the third-type product through the cooperation of the third alignment module 30 and the second distribution module 54 will be described as follows. The inner portion of the collimator 32 comprises a light plate element that is similar to the light plate 12. Firstly, a calibration chart is formed on the light plate element. The calibration chart of the light plate element comprises plural quarter-circle characteristic points. These characteristic points are used as benchmark for the adjustment of the third-type product. In an embodiment, the calibration chart can be shown on the light plate element to be viewed by the user. In addition, the adjustment of the third-type product is the adjustment about an optical center alignment, so that the reflection angle of the light beam is accurate. The mirror element of the third-type product is gripped by the gripping device 542. The lens element and the image sensor of the third-type product are transferred by the second transfer device 541. After the image sensor is enabled, the mirror element is adjusted by the gripping device 542. Consequently, the content of the reflected light view detected by the image sensors is aligned with the center position of the calibration chart. By analyzing the optical center, the user can confirm whether the active alignment process is completed.

In the above embodiments, the active alignment machine of the present invention is applied to three types of products. The three alignment modules of the active alignment machine are replaceable to be assembled with or disassembled from the same group of pillars or various groups of pillars in the same machine. Consequently, the focusing adjustment or the optical center alignment of the active alignment process can be performed on the corresponding types of products. On the production line, only a single active alignment machine is used to adjust three types of image pickup devices or products. Consequently, the production cost and the equipment cost are effectively reduced. In case that the active alignment machine is equipped with two groups of pillars, the active alignment machine can simultaneously adjust two types of products or simultaneously adjust two products of the same type. Afterwards, a glue bonding procedure and a fixing procedure are completed. Consequently, the working time is effectively saved, and the production efficiency is increased.

Moreover, the alignment modules of the present invention (especially the first alignment module and the second alignment module) are equipped with the quick release elements that can be quickly disassembled. Consequently, these alignment modules can be assembled quickly and disassembled quickly. In case that a different product on the production line needs to undergo the active alignment process, the current alignment module can be quickly replaced with the required alignment module. Consequently, the functions of the flexible configuration and the rapid application are achievable.

Consequently, the active alignment machine of the present invention is capable of effectively overcoming the drawbacks of the conventional technologies and achieving the purposes of the present invention.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. An active alignment machine, comprising:
a base;
a first pillar installed on the base, wherein the first pillar has a first pillar top surface;
a second pillar installed on the base, wherein the second pillar has a second pillar top surface, and the first pillar top surface and the second pillar top surface cooperatively support plural assembling specifications;
a distribution module installed on the base, and arranged between the first pillar and the second pillar;

a first alignment module, wherein the first alignment module performs an active alignment after being assembled;

a second alignment module, wherein the second alignment module performs the active alignment after being assembled; and a third alignment module, wherein the third alignment module performs the active alignment after being assembled;

wherein the first alignment module, the second alignment module and third alignment module are replaceable to be assembled with or dissembled from the first pillar top surface and the second pillar top surface, wherein the first alignment module, the second alignment module and third alignment module work with the distribution module to perform the active alignment on a first-type product, a second-type product and a third-type product, respectively.

2. The active alignment machine according to claim 1, wherein the distribution module comprises:

a first transfer device that transfers lens elements or mirror elements of the first-type product, the second-type product and the third-type product;

a gripping device that grips the lens elements or the mirror elements to perform a focusing adjustment or an optical center alignment; and a second transfer device that transfers image sensors of the first-type product, the second-type product and the third-type product.

3. The active alignment machine according to claim 1, wherein a first assembling interface is disposed on the first pillar top surface, and a second assembling interface is disposed on the second pillar top surface, wherein the first alignment module, the second alignment module and third alignment module are configured to be assembled on the first assembling interface and the second assembling interface.

4. The active alignment machine according to claim 3, wherein the first alignment module comprises:

a first frame comprising four first support legs, wherein the four first support legs are assembled on the first assembling interface and the second assembling interface; and a light plate installed on the first frame, wherein the light plate is movable on the first plate to simulate a distance.

5. The active alignment machine according to claim 4, wherein the first assembling interface and the second assembling interface comprise plural positioning holes, and the plural first support legs comprise plural first locking elements and plural first quick release elements, wherein the plural positioning holes are aligned with the corresponding first locking elements and assembled with the corresponding first locking elements, and the plural first locking elements are fixed or disassembled through the corresponding first quick release elements.

6. The active alignment machine according to claim 4, wherein the active alignment machine further comprises a base transmission interface, and the base transmission interface is installed on the first pillar or the second pillar, wherein the first alignment module further comprises a first transmission interface, and the first transmission interface is installed on the first frame and electrically connected with the base transmission interface.

7. The active alignment machine according to claim 4, wherein the first alignment module further comprises a relay lens device, and a lateral edge of the relay lens device is assembled with the first assembling interface or the second assembling interface, wherein the relay lens device is aligned with the light plate to simulate the distance.

8. The active alignment machine according to claim 7, wherein the first assembling interface and the second assembling interface comprise plural positioning holes, and the lateral edge of the relay lens device comprises plural lens locking elements and plural lens quick release elements, wherein the plural positioning holes are aligned with the corresponding lens locking elements and assembled with the corresponding lens locking elements, and the plural lens locking elements are fixed or disassembled through the corresponding lens quick release elements.

9. The active alignment machine according to claim 7, wherein the active alignment machine further comprises a base transmission interface, and the base transmission interface is installed on the first pillar or the second pillar, wherein the relay lens device further comprises a lens transmission interface, and the lens transmission interface is installed on the lateral edge and electrically connected with the base transmission interface.

10. The active alignment machine according to claim 3, wherein the second alignment module comprises:

a second frame comprising four second support legs, wherein the four second support legs are assembled on the first assembling interface and the second assembling interface; and plural collimators evenly distributed on the second frame, wherein the plural collimators perform the active alignment.

11. The active alignment machine according to claim 10, wherein the first assembling interface and the second assembling interface comprise plural positioning holes, and the plural second support legs comprise plural second locking elements and plural second quick release elements, wherein the plural positioning holes are aligned with the corresponding second locking elements and assembled with the corresponding second locking elements, and the plural second locking elements are fixed or disassembled through the corresponding second quick release elements.

12. The active alignment machine according to claim 10, wherein the active alignment machine further comprises a base transmission interface, and the base transmission interface is installed on the first pillar or the second pillar, wherein the second alignment module further comprises a second transmission interface, and the second transmission interface is installed on the second frame and electrically connected with the base transmission interface.

13. The active alignment machine according to claim 3, wherein the third alignment module comprises:

a collimator that performs the active alignment; and an assembling plate connected with the collimator, wherein the assembling plate is assembled on the first assembling interface or the second assembling interface.

14. The active alignment machine according to claim 13, wherein the first assembling interface and the second assembling interface comprise plural positioning holes, and the assembling plate comprises plural third locking elements, wherein the plural positioning holes are aligned with the corresponding third locking elements and assembled with the corresponding third locking elements.

15. The active alignment machine according to claim 13, wherein the active alignment machine further comprises a base transmission interface, and the base transmission interface is installed on the first pillar or the second pillar, wherein the third alignment module further comprises a third transmission interface, and the third transmission interface is installed on the third frame and electrically connected with the base transmission interface.

16. The active alignment machine according to claim 1, further comprising:
- a third pillar installed on the base, wherein the third pillar has a third pillar top surface;
- a fourth pillar installed on the base, wherein the fourth pillar has a fourth pillar top surface, and the third pillar top surface and the fourth pillar top surface cooperatively support plural assembling specifications; and
- an additional distribution module installed on the base, and arranged between the third pillar and the fourth pillar,
- wherein the first alignment module, the second alignment module and third alignment module are replaceable to be assembled with or dissembled from the third pillar top surface and the fourth pillar top surface, wherein the first alignment module, the second alignment module and third alignment module work with the additional distribution module to perform the active alignment on the first-type product, the second-type product and the third-type product, respectively.

17. The active alignment machine according to claim 16, further comprising:
- a first placement device installed on the base, wherein lens element or mirror elements of the first-type product, the second-type product and the third-type product are placed by the first placement device; and
- a second placement device installed on the base, wherein image sensors of the first-type product, the second-type product and the third-type product are placed by the second placement device,
- wherein the first placement device and the second placement device are located near the second pillar and third pillar.

* * * * *